(12) United States Patent
Thömmes et al.

(10) Patent No.: US 8,970,169 B2
(45) Date of Patent: Mar. 3, 2015

(54) CHARGING DEVICE FOR A HIGH-VOLTAGE BATTERY OF A MOTOR VEHICLE, CHARGING SYSTEM AND METHOD OF OPERATING A CHARGING SYSTEM

(75) Inventors: Marco Thömmes, Ingolstadt (DE); Thomas Felkel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/110,257

(22) PCT Filed: Mar. 30, 2012

(86) PCT No.: PCT/EP2012/001418
§ 371 (c)(1),
(2), (4) Date: Oct. 7, 2013

(87) PCT Pub. No.: WO2012/136336
PCT Pub. Date: Oct. 11, 2012

(65) Prior Publication Data
US 2014/0021921 A1 Jan. 23, 2014

(30) Foreign Application Priority Data
Apr. 8, 2011 (DE) .......................... 10 2011 016 539

(51) Int. Cl.
*H02J 7/00* (2006.01)
*B60L 11/18* (2006.01)
(Continued)

(52) U.S. Cl.
CPC ........... *B60L 11/1816* (2013.01); *B60L 3/0069* (2013.01); *B60L 3/04* (2013.01); *B60L 11/1868* (2013.01); *H02H 3/167* (2013.01); *H02H 3/332* (2013.01); *B60L 2210/30* (2013.01); *H02H 7/18* (2013.01); *Y02T 10/7088* (2013.01);
(Continued)

(58) Field of Classification Search
USPC ...................................... 320/109; 361/42, 115
See application file for complete search history.

(56) References Cited

U.S. PATENT DOCUMENTS

| 5,334,912 | A | 8/1994 | Counts |
| 7,068,047 | B2 * | 6/2006 | Ward ............................ 324/606 |
| 7,221,142 | B2 * | 5/2007 | Murray et al. ............ 324/117 R |

FOREIGN PATENT DOCUMENTS

| DE | 10 2008 004 868 A | 7/2009 |
| EP | 1 478 070 A1 | 11/2004 |

(Continued)

OTHER PUBLICATIONS

International Search Report issued by the European Patent Office in International Application PCT/EP2012/001418 on Apr. 4, 2012.

*Primary Examiner* — Samuel Berhanu
(74) *Attorney, Agent, or Firm* — Henry M. Feiereisen LLC

(57) ABSTRACT

A charging device for a high-voltage battery of a motor vehicle, in particular a charging device installed in a motor vehicle, can be connected to an alternating current network via a connection device, which includes a residual current circuit breaker that does not detect a residual current of at least one residual current type, in particular a DC residual current. The charging device further includes a controllable component and a residual current detector for detecting a residual current of the residual current type, wherein the residual current detector controls the component to change the characteristic of the residual current in such a way that the residual current can be detected with the residual current circuit breaker.

9 Claims, 1 Drawing Sheet

(51) Int. Cl.
  *B60L 3/00*   (2006.01)
  *B60L 3/04*   (2006.01)
  *H02H 3/16*   (2006.01)
  *H02H 3/33*   (2006.01)
  *H02H 7/18*   (2006.01)
(52) U.S. Cl.
  CPC .......... *Y02T10/7005* (2013.01); *Y02T 10/7241* (2013.01); *Y02T 10/7066* (2013.01); *Y02T 90/121* (2013.01); *Y02T 90/14* (2013.01); *Y02T 90/127* (2013.01)
  USPC .............................. 320/109; 361/42; 361/115

(56) References Cited

FOREIGN PATENT DOCUMENTS

| | | |
|---|---|---|
| EP | 2 159 898 A1 | 3/2010 |
| GB | 2 270 770 A | 3/1994 |
| JP | 200-270463 A | 9/2000 |
| JP | 2000-270463 A | 9/2000 |

* cited by examiner

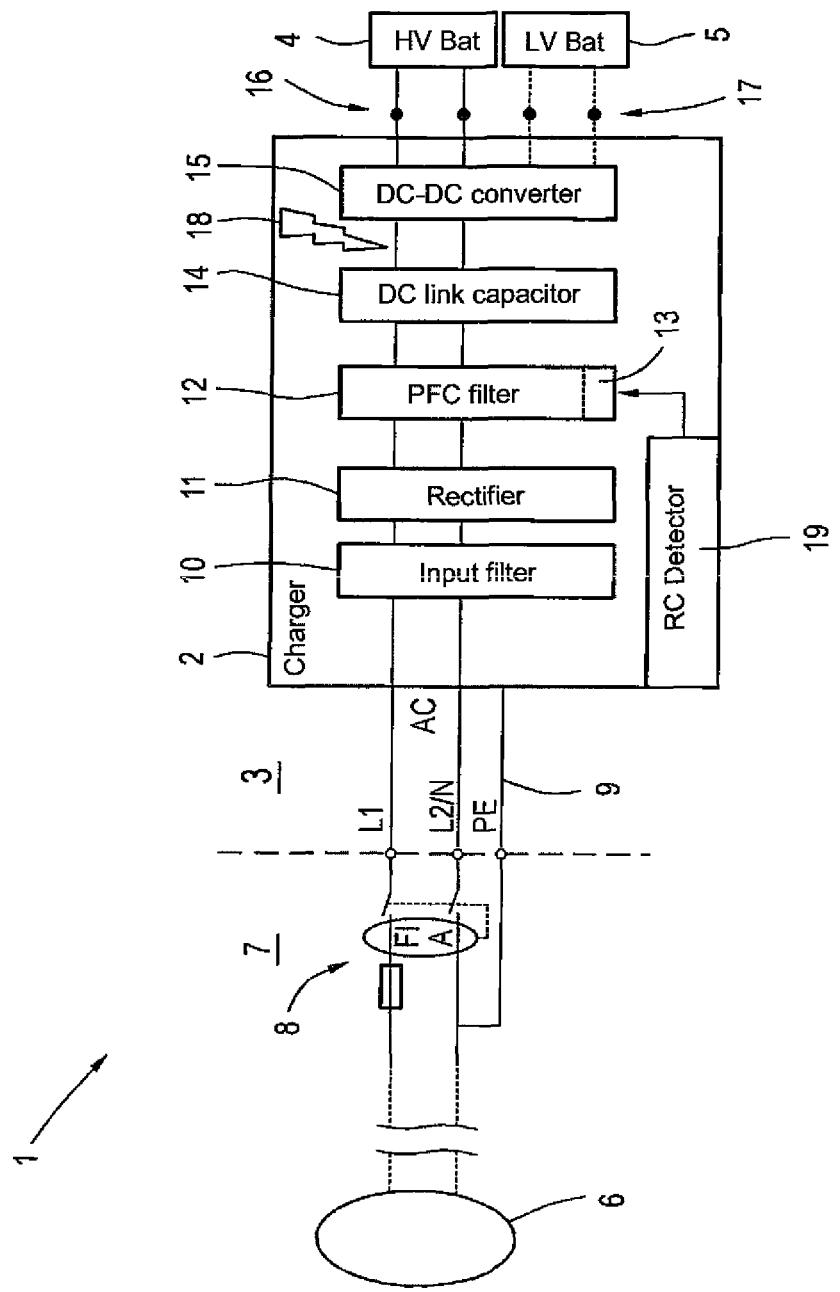

CHARGING DEVICE FOR A HIGH-VOLTAGE BATTERY OF A MOTOR VEHICLE, CHARGING SYSTEM AND METHOD OF OPERATING A CHARGING SYSTEM

CROSS-REFERENCES TO RELATED APPLICATIONS

This application is the U.S. National Stage of International Application No. PCT/EP2012/001418, filed Mar. 30, 2012, which designated the United States and has been published as International Publication No. WO 2012/136336 A2 and which claims the priority of German Patent Application, Serial No. 10 2011 016 539.8, filed Apr. 8, 2011, pursuant to 35 U.S.C. 119(a)-(d).

BACKGROUND OF THE INVENTION

The invention relates to a charging device for a high-voltage battery of a motor vehicle, in particular a charging device installed in a motor vehicle, wherein the charging device is connected via a connection device to an alternating current network, wherein the connection device includes a residual current circuit switch incapable of detecting a residual current of at least one type of residual current, especially a DC residual current. In addition, the invention relates to a charging system with such a charging device and a connection device and a method for operating a charging system.

Motor vehicles are known that can also be operated with electrical energy, wherein electric vehicles receiving their propulsion energy solely from an electrical energy store, in particular a high-voltage battery, as well as hybrid vehicles obtained their propulsion energy in addition to the high-voltage battery from other energy sources, especially fossil fuels, have been disclosed.

In order to charge the high-voltage battery of such vehicle, it has been proposed to charge the high-voltage battery, in particular together with a low-voltage battery, from a conventional AC power supply, for example the residential network of the operator of the motor vehicle. While the additional low-voltage battery (also referred to as vehicle battery) has typically a voltage of about 12 V, the high-voltage battery has a higher voltage than the low-voltage battery, particularly a voltage above 50 V. High-voltage batteries with a battery voltage between 150 and 270 V are also known and in use. Thus, a special charging system is required to charge the high-voltage battery, preferably the high-voltage battery and the low-voltage battery. A charger, hereinafter also referred to as charging device, can be installed in the motor vehicle and may have a connector in which a mating connector with a charging cable can be inserted. The other side of the charging cable is connected, in particular via an electronics box and the like, with the AC network; optionally, a charging station with an appropriate charging cable may also be provided as connection to the AC mains.

Since this involves working with high-voltages and high currents, it is known to provide a residual current circuit breaker (FI switch) as protection against electric shock in the charging infrastructure, hereinafter referred to as connection device. Such a residual current circuit breaker can be installed, for example, in the charging station, in an electronics box in the charging cable or in the connector itself. It is also conceivable to already provide the FI-switch in or adjacent to a standard power outlet of the AC network. For cost and space considerations, it is common practice to use a type A residual current circuit breaker (FI type A). However, it has been observed that the type A residual current circuit breakers are unable to detect all residual currents that may occur in the charging device. These are so-called DC residual currents that would possibly be detectable with a type B residual current circuit breaker, which is however extremely large and expensive and is therefore rarely used.

SUMMARY OF THE INVENTION

It is therefore an object of the invention to improve a charging device so as to provide increased safety for an operator from currents that are not detectable by an existing residual current circuit breaker, in particular a type A residual current circuit breaker.

To attain this object the invention, a charging device of the aforedescribed type includes a controllable component, and a residual current detection device for detecting a residual current of the type of residual current, wherein the residual current detection device is configured to control the component so as to change the characteristic of the residual current such that the residual current can be detected by the residual current circuit breaker.

The residual current circuit breaker is in particular a type A fault circuit current breaker, and the non-detectable residual currents, i.e. the at least one of type of residual current, are DC residual currents. Such DC residual currents occur in particular near components that are connected downstream of the rectifier, which is used to charge the high-voltage battery and, optionally, the low-voltage battery. The concept underlying the present invention is to detect the residual current within the charger, i.e. the charging device, and to then modify in response the characteristic of the residual current so that the residual current circuit breaker, in particular the Type A FI, is able to detect the leakage current and to shut off the system accordingly. The necessary safety of a charging system can thereby be maintained without requiring a larger and more expensive residual current circuit breaker, particularly a type B residual current circuit breaker.

In a particularly advantageous embodiment of the present invention, the component is a power factor correction filter (PFC—Power Factor Correction), which can be deactivated by the control. For deactivating the power factor correction filter, a clocked element of the power factor correction filter, in particular a transistor, may be deactivated. Those power factor correction filters, usually referred to as PFC, are intended to minimize the fraction of interfering harmonics and thus bring the power factor as close to 1. In this case, an embodiment of an active harmonic filter is used in the charging device which is connected directly downstream of the rectifier and represents an up-converter, which raises the voltage to the required intermediate voltage, for example 450 V. Such active PFC is controllable by tracking with a switch or a switching power supply as the clocking element of the power factor correction filter the received current drawn to follow the temporal course of the sinusoidal mains voltage. It has been observed that resulting DC currents, which occur for example downstream of the PFC, have the characteristic of a DC residual current only when the power factor correction filter is active. Accordingly, it is proposed to disable the power factor correction filter such that the characteristic of the residual current is changed to a characteristic that is detectable by the residual current circuit breaker. Therefore, after disconnection of the power factor correction filter, a residual current circuit breaker of the type A in the connection device is able to detect the residual current and be triggered.

In another embodiment of the present invention, the residual current detection device may be constructed as a residual current monitor (RCM). Such RCMs are essentially known and monitor the differential current in electrical systems. When a specified current difference is exceeded, the RCM notifies, in particular through messaging contacts, that this critical value has been exceeded, so that the message can then be used to modify the characteristic of a detected residual current through appropriate control of the component.

In this context, the residual current detection device may advantageously be designed to detect several types of residual currents, in particular all types of residual currents. Thus, the residual current detection device is a kind of fallback, if then a suitable change of characteristic occurs.

In addition to the charging device, the invention also relates to a charging system with a charging device according to the invention and the connection device. All statements concerning the charging device can analogously be applied to the charging system, so that the advantages of the invention may likewise be achieved. It should be noted here that the residual current circuit breaker may be provided in various components of the connection device, particularly in an electronics box, a charging station, the plug, or even as a part of the infrastructure of a house itself, for example, installed in a standard wall outlet.

Lastly, the invention relates to a method for operating a charging system, in particular a charging system according to the invention, for a high-voltage battery in a motor vehicle, which therefore includes a charging device that may be installed on a motor vehicle itself. A connection device allows connecting the charging device for charging the high-voltage battery to an AC power mains, wherein the connection device includes a residual current circuit breaker which is unable to detect at least one residual current, especially a DC residual current. According to the method of the invention, a residual current is measured inside the charging device, and when a residual current that cannot be detected by the residual current circuit breaker, the characteristic of the residual current is changed such that the residual current is detected by the residual current circuit breaker. Hence, within the context of the method, a residual current of the type that is not detectable is converted into a residual current of a residual current type that can be detected by the residual current circuit breaker which is then triggered and disconnects the charging system from the AC mains. All statements regarding the charging device of the invention can also be applied to the method of the invention.

BRIEF DESCRIPTION OF THE DRAWING

Further advantages and details of the present invention will become apparent from the following exemplary embodiments and the with reference to the drawings.

FIG. 1 shows a schematic diagram of a charging system according to the invention.

DETAILED DESCRIPTION OF PREFERRED EMBODIMENTS

FIG. 1 shows a schematic diagram of a charging system 1 according to the invention. It includes a charging device 2 which is installed in a motor vehicle 3 (not shown in detail). The charging device 2 is used to charge a high-voltage battery 4 installed in the motor vehicle 3, which in the present illustrated example requires a charging voltage in the range of 200 V. The motor vehicle 3 further includes a low-voltage battery 5 (system battery) which can also charged via the charging system 1. The low-voltage battery 5 operates at a battery voltage of 12 V, whereas the high-voltage battery generally operates at a higher battery voltage.

The charging device 2 is operated with AC power from a conventional AC mains 6, for example the 220 V AC power grid that is standard in Germany. To connect the charger 2 installed in the motor vehicle 3 to the AC mains 6, a connection device 7 is provided, of which only the relevant components are schematically illustrated. The connection device 7 may include a charging cable having plugs on both ends, wherein one plug is configured to be inserted in a corresponding unillustrated connector of the charging device 2, wherein the other connector is inserted, for example, in a conventional socket of the AC mains 6. To prevent an electric shock to an operator, the connection device includes a residual current circuit breaker 8 which is formed here as a residual current circuit breaker of type A. The residual current circuit breaker may be arranged, for example, in a connector of the connection device 7, an electronics box of the coupling device 7, a charging station of the connection device 7 or the like; however, the residual current circuit breaker may also be arranged in or adjacent to a socket of the AC system 6 provided for connecting a charging cable or a charging station, which is to be understood within the context of the present invention as a part of the connection device 7.

Presently, single-phase charging is illustrated. It should be noted here that, as is customary with such charging systems 1, of course, a protective conductor 9 (PE) may also be provided.

The charging device 2 includes, as usual, first an input filter 10, with a rectifier 11 connected downstream. A power factor correction filter 12 (PFC), which is here implemented as an active PFC with a clocking element 13, is connected directly downstream of the rectifier 11. The power factor correction filter 12 is typically used in charging devices, which ensures that a sinusoidal load is drawn from the infrastructure.

A DC link capacitor 14 is connected downstream of the power factor correction filter 12. As is typical, a standard DC-DC converter 15 is connected downstream, which provides the necessary charging voltages at the terminals 16 and 17.

The residual current circuit breaker 8 of the type A is unable to detect DC residual currents within the charging device 2, for example at the position 18. To ensure greater safety, the charging device 2 therefore includes a residual current detection device 19 capable of detecting DC currents. The residual current detection device 19 is hereby a residual current monitor (RCM). When the residual current monitor measures a residual current, the power factor correction filter 12 is automatically disabled. This is preferably done by switching off the clocking element 13, which may be formed for example as a transistor. Deactivation of the power factor correction filter 12 by the residual current detecting device 9 causes a change in the characteristic of DC residual current that cannot be detected by the residual current circuit breaker 8 so that a different type of residual current is present on the residual current circuit breaker 8, which can then be detected. Accordingly, the residual current circuit breaker 8 is then responsive to the detected residual current and causes disconnection from the AC grid 6, so that no electric shock can occur as a result of the DC residual current, and the safety of the operator is ensured.

It follows from this description that the illustrated charging system can also be used for carrying out the method according to the invention.

What is claimed is:

1. A charging device for a high-voltage battery of a motor vehicle, comprising:
   a connector configured receiving an external plug of a connection device for connecting the charging device to an alternating current network, wherein the connection device comprises a residual current circuit breaker incapable of detecting at least a DC residual current, a controllable component constructed as a power factor correction filter, and a residual current detection device configured to detect the DC residual current, wherein the residual current detection device controls the controllable component so as to deactivate the controllable component and change a characteristic of the residual current such that the residual current is detected by the residual current circuit breaker.

2. The charging device of claim 1, wherein the charging device is installed in a motor vehicle.

3. The charging device of claim 1, wherein the power factor correction filter is deactivated by deactivating a clocking-element of the power factor correction filter.

4. The charging device of claim 3, wherein the clocking-element is a transistor.

5. The charging device of claim 1, wherein the residual current detection device is constructed as a residual current monitor.

6. The charging device of claim 1, wherein the residual current detection device is configured to detect a plurality of types of residual currents.

7. The charging device of claim 1, wherein the residual current detection device is configured to detect all types of residual currents.

8. A charging system for a high-voltage battery of a motor vehicle, comprising:

a connection device comprising a residual current circuit breaker incapable of detecting at least a DC residual current, a charging device having a connector configured receiving an external plug of the connection device for connecting the charging device to an alternating current network, a controllable component constructed as a power factor correction filter, and a residual current detection device configured to detect the DC residual current, wherein the residual current detection device controls the controllable component so as to deactivate the controllable component and change a characteristic of the residual current such that the residual current is detected by the residual current circuit breaker.

9. A method for operating a charging system for a high-voltage battery of a motor vehicle having a charging device configured for connection to an alternating current network and a residual current circuit breaker incapable of detecting at least a DC residual current, comprising:

measuring a residual current within the charging device, detect the DC residual current with a residual current detection device, controlling with the residual current detection device a controllable component constructed as a power factor correction filter, and when the measured residual current cannot be detected by the residual current circuit breaker, deactivating the controllable component and changing a characteristic of the residual current such that the residual current is detected by the residual current circuit breaker.

* * * * *